United States Patent
Kraiser et al.

(10) Patent No.: US 9,588,947 B1
(45) Date of Patent: Mar. 7, 2017

(54) INTEGRATED ADMINISTRATIVE INTERFACE FOR OPEN NETWORK PROGRAMMING APPLICATIONS

(71) Applicant: CISCO TECHNOLOGY, INC., San Jose, CA (US)

(72) Inventors: Tula Kraiser, Sunnyvale, CA (US); Yi Huang, San Jose, CA (US); Atul Bhaskarrao Patil, San Jose, CA (US); Xiaohui Ye, San Jose, CA (US); John E. McDowall, Redwood City, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 116 days.

(21) Appl. No.: 14/081,253

(22) Filed: Nov. 15, 2013

(51) Int. Cl.
*G06F 17/22* (2006.01)
*G06F 17/27* (2006.01)

(52) U.S. Cl.
CPC .......... *G06F 17/227* (2013.01); *G06F 17/272* (2013.01)

(58) Field of Classification Search
CPC ............................ G06F 17/227; G06F 17/272
See application file for complete search history.

(56) References Cited

U.S. PATENT DOCUMENTS

| | | | |
|---|---|---|---|
| 2002/0191619 A1* | 12/2002 | Shafer | H04L 45/56 370/401 |
| 2013/0058225 A1 | 3/2013 | Casado | |
| 2013/0058226 A1 | 3/2013 | Casado | |
| 2013/0058228 A1 | 3/2013 | Koponen | |
| 2013/0058339 A1 | 3/2013 | Casado | |
| 2013/0058357 A1 | 3/2013 | Koponen | |
| 2013/0166703 A1* | 6/2013 | Hammer et al. | 709/220 |

OTHER PUBLICATIONS

Cisco Open Network Environment: Network Programmability and Virtual Network Overlays, 2012 (http://www.cisco.com/c/en/us/products/collateral/ios-nx-os-software/white_paper_c11-707978.pdf; "Cisco").*

* cited by examiner

*Primary Examiner* — Brian W Wathen
(74) *Attorney, Agent, or Firm* — Patent Captial Group (57) ABSTRACT

A method is provided in one example embodiment and includes compiling a schema definition file associated with a non-native application into a command file, the non-native application being executable in connection with a network element; creating at least one parse chain for the non-native application; storing the at least one parse chain in a database; and receiving a first command associated with the non-native application from a network administrator. The method further includes parsing the received first command as specified by the at least one parse chain to extract data therefrom; and presenting the extracted data to the non-native application, in which the extracted data is formatted as specified in the associated schema definition file prior to the presenting.

18 Claims, 6 Drawing Sheets

INTEGRATED ADMINISTRATIVE INTERFACE FOR OPEN NETWORK PROGRAMMING APPLICATIONS

TECHNICAL FIELD

This disclosure relates in general to the field of computer networking and, more particularly, to techniques for providing an integrated administrative interface for open network programming applications.

BACKGROUND

Software-defined networking ("SDN") is an approach to computer networking that allows network administrators to manage network services by abstracting lower level functionality by decoupling the control plane from the data plane. A goal of SDN is to simplify networking. Control plane abstraction on a platform makes it possible to physically locate the control plane outside the device itself; however, it is still essential that a network administrator be able to interact with and access information from the distributed control plane seamlessly, as the applications share individual node configuration and operational state. It would be beneficial in such situations for application configuration management to exhibit the same features and behavior as native interfaces.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes compiling a schema definition file associated with a non-native application into at least one parse chain, the non-native application being executable in connection with a network element; storing the at least one parse chain in a database; and receiving a first command associated with the non-native application from a network administrator. The method further includes parsing the received first command as specified by the at least one parse chain to extract data therefrom; and presenting the extracted data to the non-native application, in which the extracted data is formatted as specified in the associated schema definition file prior to the presenting. In certain embodiments, the extracted data may be formatted as an XML file and the first command may be one of an operation command and a configuration command. The method may further include receiving a response from the non-native application, wherein the response is formatted as specified in the associated schema definition file; and returning the response to the network administrator.

In some embodiments, the response from the non-native application comprises at least one of requested data, an indication of success, and an indication of failure. The associated schema definition file may include command syntax and command data format for the non-native application and the first command may be a Command Line Interface ("CLI") command. Additionally, the schema definition file may comprise an XML Schema Definition ("XSD"), the application-specific schema definition file may comprise an XML file defining commands associated with the non-native application and transformed using eXtensible Stylesheet Language Transformation ("XSLT"), and the non-native application may comprise an open network program.

Example Embodiments

While SDN has separated the control plane from the data plane, there may be potential in software defined networking beyond the scope of SDN and with a broader view toward Open Network Programming Environment. For example, Cisco Open Network Environment ("ONE"), available from Cisco Systems, Inc., of San Jose, Calif., enables open software developers to write applications and extend networking features, which may include writing their own SDN agent and running it as a local subsystem on Cisco platforms, using various tools. Applications written with the programming interface run as an integral part of the ONE system and share the system's configuration and operational states. Such applications need to provide administrator control to configure and operate the application state as any other native subsystem on the platform.

Embodiments described herein provide software, system, methodology, and Application Programming Interfaces ("APIs") to application developers to enable them to extend the native administrative interface for their applications. In one embodiment, an Application Management Service ("AMS") may provide the ability to install/uninstall application-defined administrative interface extensions at runtime, as well as support for configuration and operational commands, and native command line interface ("CLI") features. The AMS may further provide support for application-defined submodes, application configuration as a part of system configuration (i.e., "show run"), and persistent configurations across system reboots. The AMS may further provide high-availability, version support (including in-service upgrade and downgrade ("ISSU/D")), and decoupling of administrative interface from the application, which allows the administrator to preconfigure the application configuration before instantiating the application.

Via the AMS, all application-defined commands appear to a network administrator the same as any other commands of the native subsystem. Commands applied by the administrator are communicated in the background to the application and the application response is communicated back to the interface via the system infrastructure. As a result, the AMS provides a CLI Extension ("CLIExt") language to allow application developers to define application management data. In particular, the CLIExt language describes syntax for the CLI and metadata for the application data structure and hierarchy. A CLIExt XML document is compiled by the application developer using any type of compiler, e.g., a CLIExt compiler, (also referred to herein as "CLI_EXTENSIONS.XSLT") that extracts metadata information from the syntax of commands mapping to the data. The metadata is shared as a language-independent form of communication between the platform and the application. The platform uses the metadata in conjunction with the syntax to perform on-the-fly conversion of a command entered by a network administrator to data as specified by the metadata schema definition. The data is sent to the application and the application in turn consumes the data, parsing it as per the schema definition, and replies with the appropriate response. As a result, and as will be described in greater detail below, the AMS provides the ability to dynamically extend the command set and perform on-the-fly conversion of command syntax to schema-defined syntax.

Embodiments described herein enable an application to extend a network element's command line based management interface ("CLI"). This enables applications to seamlessly add features to a network element's OS and enables the network element to store specific configuration data for applications. Network administrators can configure the application and execute commands using the CLI in a manner similar to the way in which they currently configure applications that are native to the network element. As will be described, in one embodiment, applications run in containers (or "virtual services") on the network element or on remote hosts ("host-based applications"). The following application multi-instance scenarios are supported:

1. the same application running in multiple containers on the network element and also on one or more remote hosts;
2. multiple instances of the same application running in the same container on the network element; and
3. multiple versions of the same application running in different containers on the network element and also on one or more remote hosts.

Embodiments shown and described herein include run-time components and compile-time components. Application developers use the compile-time components to define their commands. The commands can modify and/or add application configuration ("config commands"), query other applications for operational data, or execute some specific action ("exec commands"). Non-native applications use the CLIExt APIs to communicate with the network element, which in one embodiment comprises a network switch, and retrieve confirmation or respond to a command. The APIs are implemented by CLIExt run-time components.

Figure 1:
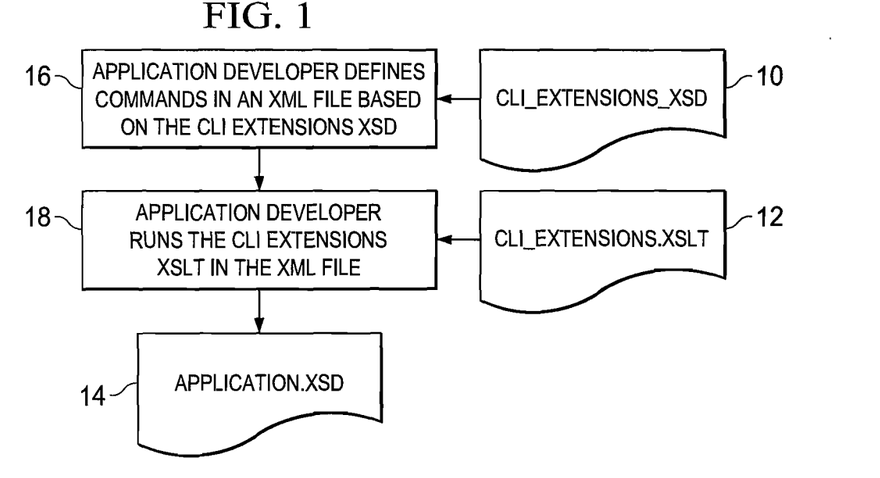
FIG. 1 is a high level flow diagram of a process for defining CLI extensions in accordance with embodiments described herein for implementing an integrated administrative interface for open network programming applications.

FIG. 1 illustrates a process for defining CLI Extensions. As shown in FIG. 1, compile-time components may include a schema file 10 used to define the commands of the application ("CLI Extension XML Schema Definition ("CLIExt.XSD")) and a transformation file 12 ("CLI Extension eXtensible Stylesheet Language Transformation ("CLI_EXTENSIONS.XLST")) used to transform the application defined XML file with its commands to an application schema definition file ("application.xsd") 14. In operation, the application developer defines the application's commands in an XML file based on the CLIExt XSD (step 16) and then runs the CLI_EXTENSIONS.XLST on the XML file to create the application XSD (step 18). More specifically, the application developer writes an XML file based on the CLIExt XSD defining the configuration and execution commands of the application. After validating the XML file, the developer runs the XSLT using a browser or another tool that contains an XSLT interpreter, against the XML file to produce an application-specific schema file.

Figure 2:
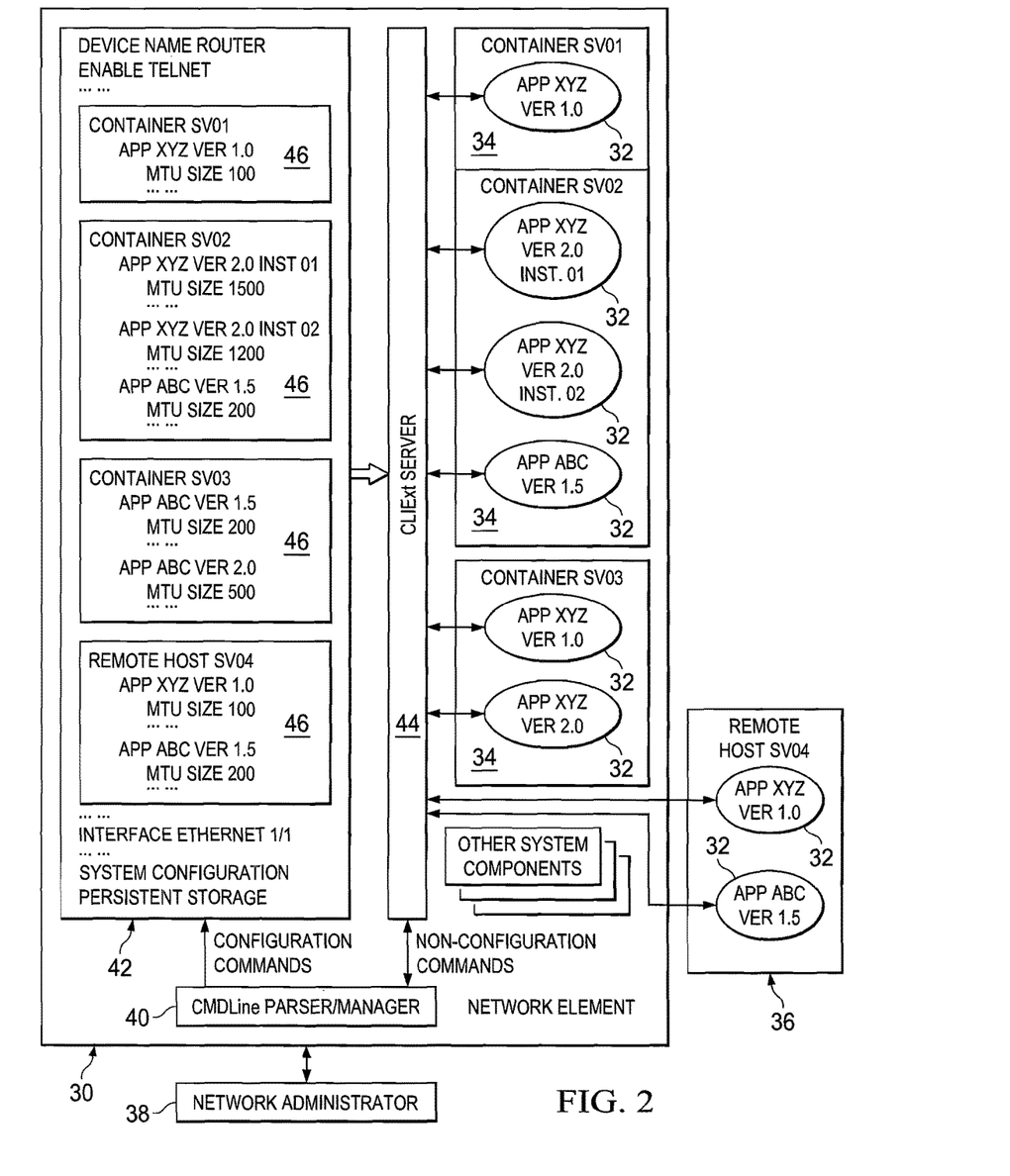
FIG. 2 illustrates a high level system block diagram of a network element in accordance with embodiments described herein for implementing an integrated administrative interface for open network programming applications.

FIG. 2 illustrates a high level system block diagram of a network element 30 embodying features of embodiments described herein for implementing an integrated administrative interface for open network programming applications. As shown in FIG. 2, a plurality of applications 32 may be hosted in containers 34 running on the network element 30 or on a remote host 36 connected to the network element 30. Each of the containers 34 or remote host 36 may simultaneously host different versions of an application. A container or remote host can also simultaneously host multiple instances of the same version of an application.

When a configuration command associated with one of the applications 32 is received by the network element 30, e.g., from a network administrator 38, a CMDLine Parser 40 forwards the received command to System Configuration Persistent Storage ("SCPS") 42, which in turns forwards the command to a CLIExt Server 44. If the application to which the received command is directed is running on or connected to the network element 30, CLIExt Server 44 will forward the configuration command to the application. Otherwise, the configuration command will be forwarded to the application from SCPS 42 when it subsequently connects to the network element 30 and requests its configuration. Upon receipt of the configuration command, the application will implement the configuration. The application may also return messages to CLIExt Server 44 to indicate an incorrect configuration that cannot be applied. In this case, the CLIExt Server 44 notifies the SCPS 42 to remove the incorrect configuration from a corresponding one of a plurality of configuration files.

The CMDLine Parser 40 sends non-configuration (e.g., operation or exec commands) commands it receives directly to CLIExt Server 44, which forwards the non-configuration commands to the application to which it is directed, if that application is connected to the network element 30 at the time the command is received. Upon receipt of a nonconfiguration command, the application constructs a response and returns it to the CLIExt Server 44. CLIExt Server 44 then forwards the application's response to the CMDLine Parser 40 to display the response to the network administrator 38.

Figure 3:
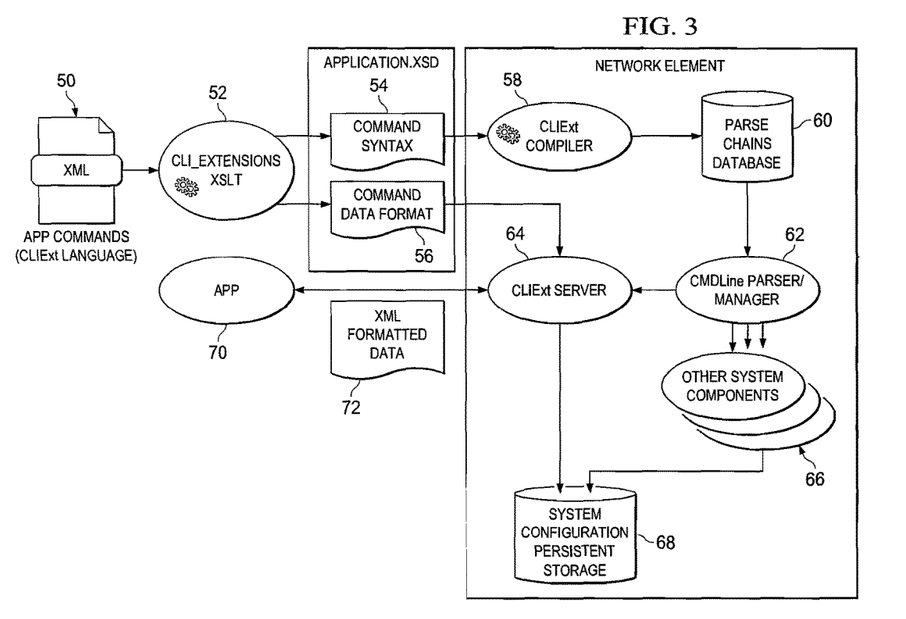
FIG. 3 illustrates a functional block diagram of a system in accordance with features of embodiments described herein for implementing an integrated administrative interface for open network programming applications.

FIG. 3 illustrates a functional block diagram of a system in accordance with features of embodiments described herein for implementing an integrated administrative interface for open network programming applications. As shown in FIG. 3, and described above, a developer creates a CLIExt XSD 50 comprising a definition of application commands. The CLIExt XSD 50 is translated by a CLI_EXTENSION-XSLT 52 into command syntax 54, which comprises command syntactical metadata, and command data format 56.

Command data format 56 comprises metadata information (XSD) about embedded data in the command syntax (e.g., integer/string/IP-Address, etc.), along with the structural information (e.g., <application><datalevel1> integer <datalevel2> string </datalevel2> </datalevel1> </application>). Command syntax 54 is provided to a CLIExt Compiler 58 that compiles command syntax specifications into device-specific parse chains, which are stored in a parse chain database 60. The parse chains database 60 is a system database of metadata of all of the commands used by CMDLine Parser/Manager 62 to parse the command and extract the data input from the commands. The CMDLine Parser/Manager 62 comprises the parser engine that takes as input a user input command line, parses it per the command metadata in the parse chain, and distributes the command to the backend if necessary.

Figure 4:
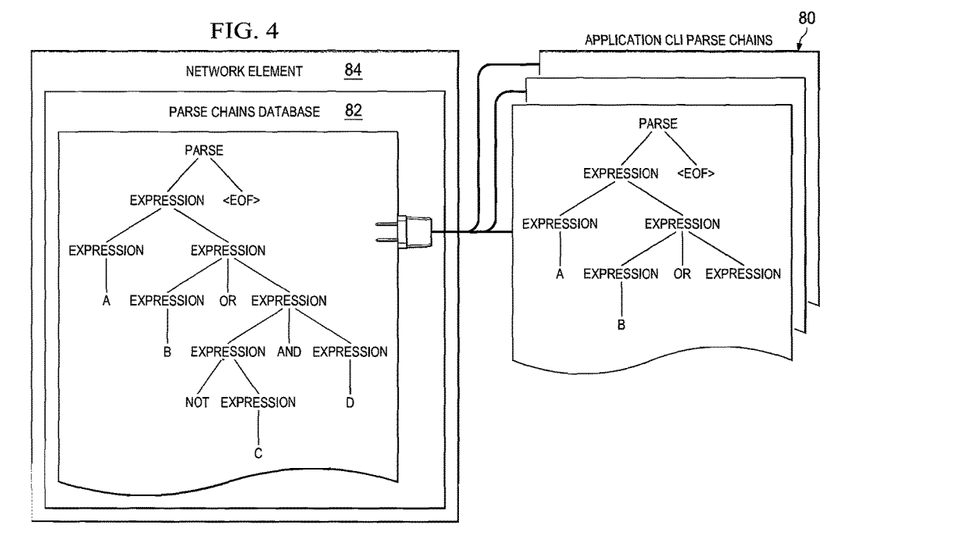
FIG. 4 illustrates a block diagram of plugin of application CLI parse chains to native CLI parse chains in accordance with features of embodiments described herein for implementing an integrated administrative interface for open network programming applications.

CLIExt Server 64 is a CLI Extension module that communicates with the CMDLine Parser/Manager 62 on behalf of applications and arbitrates the communication to and from the applications. The CLIExt Server 64 is similar to other system components 66 except that it communicates on behalf of applications. SCPS 68 comprises non-volatile system storage where data is saved to persist across reboots. The CMDLine Parser/Manager 62 communicates with other system components 66 to provide data thereto and seek operation status/data therefrom. Data extracted from commands is formatted as per the command data format 56 and presented to an application 70 in the form of XML documents 72. The application 70 receives requests/notifications for operational/configuration data and replies back with data or success/failure. Data is converted to and from XML to native parser language by the CLIExt server 64. FIG. 4 illustrates plugin of application CLI parse chains to native CLI parse chains 82 of the network element 84 in accordance with embodiments described herein.

Figure 5:
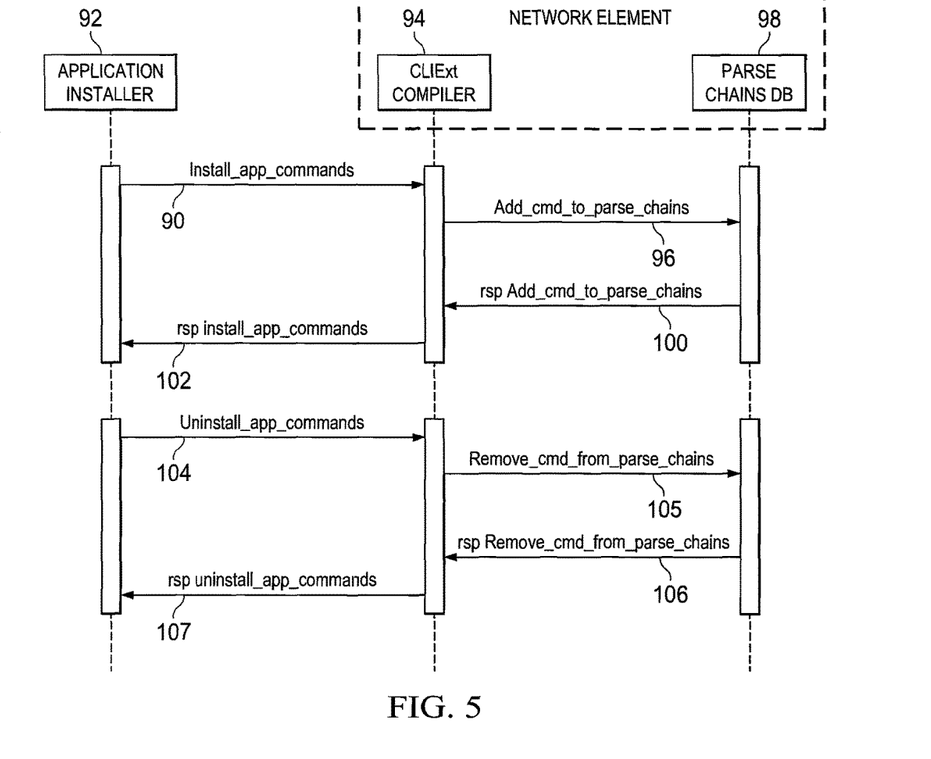
FIG. 5 illustrates an process sequence flow for installing and uninstalling an open network programming application in accordance with features of embodiments described herein for implementing an integrated administrative interface for open network programming applications.

FIG. 5 illustrates an open network application installation/uninstallation process sequence flow. Referring to FIG. 5, in step 90, an Application Installer, which may be a network administrator or an installation process, 92 connected to the network element sends an install_app_commands message to request the installation of an application. In particular, the install_app_commands message requests installation of the application's schema file (APPLICATION.XSD). A CLIExt Compiler 94 retrieves the schema file for the application and transforms the XSD file into a command file. In step 96, the CLIExt Compiler 94 sends an add_cmd_to_parse_chains command to a Parse Chains database ("DB") 98. The add_cmd_to_parse_chains commands creates a parse chain for the application, adds the created parse chain to an existing parse chain, and stores the combined parse chain in the Parse Chains DB 98 (as illustrated in FIG. 4). The parse chain contains a callback handler that, as described below with reference to FIG. 6, will be used to handle a CLI command. Upon successful creation of the parse chain, in step 100, the Parse Chains DB 98 notifies the CLIExt Compiler 94 of the successful creation. In step 102, the CLIExt Compiler 94 notifies the Application Installer 92 that the APPLICATION.XSD was installed. The command file is copied to a persistent location so that the command can be reloaded if the network element reboots. The command file may also be synced to a standby network element.

The uninstallation process is substantially the reverse of the installation process described above with reference to FIG. 5. In particular, in step 104, the Application Installer 92 sends an uninstall_app_commands message to the CLIExt Compiler 94 to request that the application be uninstalled. In particular, the uninstall_app_commands message requests uninstallation of the application. In step 105, a remove_cmd_from_parse_chains command is sent from the CLIExt Compiler 94 to the Parse Chains DB 98. The command results in the application's parse chain being removed from the Parse Chains DB 98. Upon successful removal of the parse chain, in step 106, the Parse Chains DB 98 notifies the CLIExt Compiler 94 of the successful removal. In step 107, the CLIExt Compiler 94 notifies the Application Installer 92 that the application was uninstalled.

Figure 6:
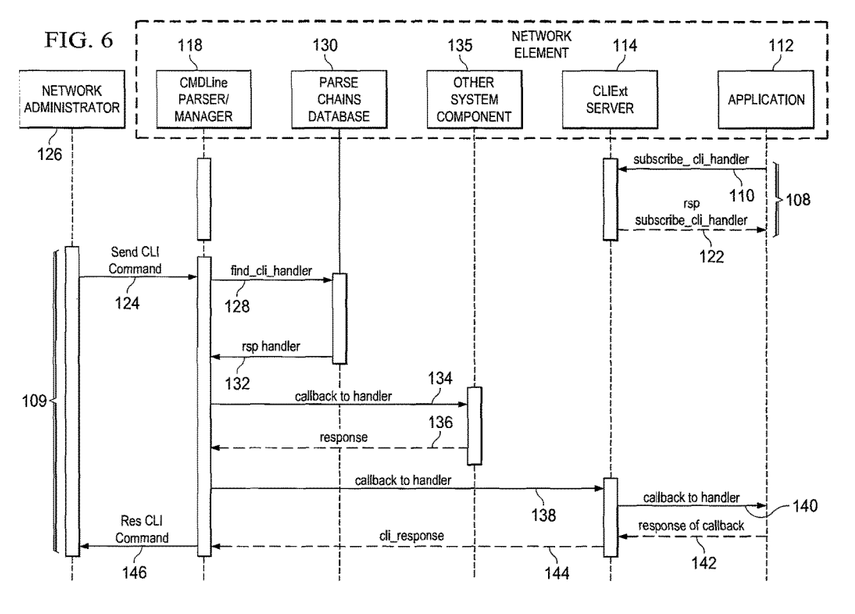
FIG. 6 illustrates a process sequence flow for establishing an application CLI handler subscription and a process sequence flow for handling a CLI request from a network administrator in accordance with features of embodiments described herein for implementing an integrated administrative interface for open network programming applications.

FIG. 6 illustrates a process sequence flow 108 for establishing an application CLI handler subscription and a process sequence flow 109 for handling a CLI request from a Network Administrator. With regard to the process 108, in step 110, an Application 112 sends a subscribe_cli_handler request to a CLIExt Server 114 to register its callback in the CLIExt Server. The Application 112 may register a "configuration handler" to listen for CLI configuration changes ("configuration CLI") and/or an "operational handler" to listen for operation CLI requests. A connect call provides the application name, version and instance name, etc., to uniquely identify the application. In step 122, the CLIExt Server 114 sends a subscribe_cli_handler response to the Application 112 to confirm the application CLI handler subscription.

Turning now to the process 110, in step 124, a network administrator 126 sends a CLI command to the CMDLine Parser/Manager 118. In step 128, the CMDLine Parser/Manager 118 executes a find_cli_handler command to a Parse Chains DB 130. In step 132, the Parse Chains DB 130 responds with the corresponding handler for the CLI command. The call back handler tells whether the CLI command is for system components that are native to the system or CLI Extension Applications, which are non-native. Assuming the CLI command is one that needs to be handled by system components, in step 134, the CMDLine Parser/Manager 118 uses a callback to send a request to a system component CLI handler 135, which responds in step 136. Alternatively, if the CLI command is one that needs to be handled by an application, in step 138, the CMDLine Parser Manager 118 uses a callback to send a request to the CLIExt Server 114, which uses a callback to forward the request to the application CLI handler 112 in step 140. In step 142, the application CLI handler 112 responds to the callback. In step 144, the CLIExt Server 114 sends a response to the CMDLine Parser Manager 118. Once a response is received by the CMDLine Parser/Manager 118, in either step 136 or in step 144, in step 146, the CMDLine Parser/Manager 118 sends a response to the CLI command to the network administrator 126. For a configuration CLI, the response sent in step 146 is the configuration status, if needed. For an operation CLI, the response sent in step 146 is the response to the operational CLI request. The response from the Application 112 is XML formatted data. As illustrated in FIG. 6, steps denoted by dashed lines represent optional responses to certain commands.

It should be noted that steps 134 and 136 illustrate how CLI requests are handled by existing system components. In contrast, steps 140, 142, 144 and 146 illustrate how CLI Extension Applications handle CLI requests. The network administrator uses the same interface to send both types of CLI requests and does not need to know whether the response is from a system component or an installed CLI Extension Application. As a result, the network administrator could be different from the application installer.

The following is an example of an application depicting use of the AMS. Hybrid features from SDN isolates ports controlled by the controller from natively-owned ports. The production network is shielded and co-exists with the open flow-enabled VLANS, bridges, and network. An open flow agent application and its administrator command interface were installed on an n3K device. All of the configuration commands to configure the openflow controller below can be installed/uninstalled by the network administrator. The network administrator could pre-configure the open flow agent as shown below and save the configuration.

sw1(config)# onep applications vs1
    sw1(config-onep-apps)# openflow v0.1
    sw1(config-ofa-v0.1)#switch 1
    sw1(config-ofa-v0.1-switch)#controller ipv4 171.70.174.106 vrf management
    sw1(config-ofa-v0.1-switch)#interface ethernet 1/1
    sw1(config-ofa-v0.1-switch)#interface ethernet 1/2
    sw1(config-ofa-v0.1-switch)#interface ethernet 1/3
    sw1(config-ofa-v0.1-switch)#interface ethernet 1/4
    sw1(config-ofa-v0.1-switch)#end
    sw1# copy running startup The network administrator in the above example configured an open-flow agent to communicate with its controller by providing it the open flow controller IP address information:

sw1(config-ofa-v0.1-switch)#controller ipv4 171.70.174.106 vrf management The administrator then moved some of the interface ports under the open flow agent ownership. "Copy running startup" saved the controller configuration to be persistent. As and when the agent is started, the preconfiguration will be made available by the AMS. If the agent is already running, the data is transmitted to the process immediately. The AMS allows the administration of the controller to appear the same as other native features to the network administrator.

Another example is in a virtualized network. When a virtual machine ("VM") moves from one physical server to another, it changes the patterns of data traffic, sometimes dramatically. Network administrators want a view into those moves and a way to allocate the right amount of network resources to each VM. Open community adds the network application in the cloud, but the native management infrastructure is a closed system and lags behind to allow access to information of those applications. The network administrator needs new tools to be able to provision the network for the applications. The AMS provides a framework to allow application provisioning.

The AMS, along with other services provided by the platform, can be used by external developers to introduce new commands and to enhance behavior or existing commands. For example, a customer may introduce their own "show interface" command that may show a subset or superset of interface data or arrange it in a different format.

The embodiments described herein add extensibility to a closed CLI system in an OS-independent manner, allowing remote programs running outside the OS to integrate their manageability extensions to the CLI of the OS. Additionally, the embodiments described herein can plug into and unplug from the management interface during runtime without requiring the OS image to be repackaged. Moreover, the embodiments described herein enable an extended CLI to possess the same capability as the native command line interfaces, e.g. persistency across system reboot, high availability ("HA"), etc. Still further, the embodiments described herein decouple the administrative interface from applications, which allows an administrator to pre-configure the application before instantiating the application and also enable an administration agent to be run locally in network element or remotely in server. The CLI definition syntax also determines transmission protocol between the administration agent and the network element. In the future, even native features may employ the methodology described herein to enable CLI syntax to be decoupled from image packaging, such that CLI syntax and handler can be dynamically updated. In summary, embodiments described herein provide software, system, methodology, and APIs to application developers so that they can add applications' specific management interfaces to the existing administrative interface at runtime and support a remotely-running management agent. Certain embodiments described herein also enable an administration agent to run locally in the network element or remotely in a server. The CLI definition syntax also determines the transmission protocol between the administration agent and the network element. Certain embodiments also enable third party management interface development on commercial routers and switches. Development of management interfaces for such devices has previously generally been proprietary; as a result, it could take a long time for a device vendor to respond to feature enhancement requests.

In one example implementation, various devices involved in implementing the embodiments described herein can include software for achieving the described functions. For example, referring to FIGS. 2 and 5, the network element 30, as well as the network administrator 38 and/or Application Installer 92, may be implemented using one or more computer devices comprising software embodied in one or more tangible media for facilitating the activities described herein. The computer device for implementing the network element and the network administrator may also include a memory device (or memory element) for storing information to be used in achieving the functions as outlined herein. Additionally, the computer device for implementing the network element and the network administrator may include a processor that is capable of executing software or an algorithm to perform the functions as discussed in this Specification, including but not limited to the functions illustrated in and described with reference to FIGS. 5 and 6. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that in certain example implementations, the functions outlined herein and in FIGS. 5 and 6 may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element can store data used for the operations described herein. This includes the memory element being able to store software, logic, code, or processor instructions that are executed to carry out the activities described in this Specification, including but not limited to the functions illustrated in and described with reference to FIGS. 5 and 6. A processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network elements may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the example provided above, as well as numerous other examples provided herein, interaction may be described in terms of two, three, or four components. However, this has been done for purposes of clarity and example only. In certain cases, it may be easier to describe one or more of the functionalities of a given set of flows by only referencing a limited number of components. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to a myriad of other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   compiling a schema definition file associated with a non-native application into a command file, the non-native application being executable in connection with a network element;
   creating at least one parse chain for the non-native application, wherein the at least one parse chain comprises command metadata for parsing Command Line Interface ("CLI") commands and extracting data input from the CLI commands;
   storing the at least one parse chain in a database;
   receiving a first CLI command associated with the non-native application from a network administrator;
   parsing the received first CLI command as specified by command metadata in the at least one parse chain to extract data therefrom; and
   presenting the extracted data to the non-native application, wherein the extracted data is formatted as specified in the associated schema definition file prior to the presenting;
   wherein the schema definition file comprises an XML file defining commands associated with the non-native application after the XML file has been transformed using eXtensible Stylesheet Language Transformation ("XSLT"), wherein the XSLT transforms the XML file into command syntactical metadata and command data format information comprising the schema definition file.

2. The method of claim 1, wherein the extracted data is formatted as an XML file.

3. The method of claim 1, wherein the first command comprises one of an operation command and a configuration command.

4. The method of claim 1 further comprising:
receiving a response from the non-native application, wherein the response is formatted as specified in the schema definition file; and
returning the response to the network administrator;
wherein the response comprises at least one of requested data, an indication of success, and an indication of failure.

5. The method of claim 1 further comprising storing the command file in persistent storage associated with the network element.

6. The method of claim 1, wherein the schema definition file comprises command syntax and command data format for the non-native application.

7. The method of claim 1, wherein the first command is a Command Line Interface ("CLI") command.

8. The method of claim 1, wherein the schema definition file comprises an XML Schema Definition ("XSD").

9. The method of claim 1, wherein the non-native application comprises an open network program.

10. One or more non-transitory tangible media that includes code for execution and when executed by a processor is operable to perform operations comprising:
compiling a schema definition file associated with a non-native application into a command file, the non-native application being executable in connection with a network element;
creating at least one parse chain for the non-native application, wherein the at least one parse chain comprises command metadata for parsing Command Line Interface ("CLI") commands and extracting data input from the CLI commands;
storing the at least one parse chain in a database;
receiving a first CLI command associated with the non-native application from a network administrator;
parsing the received first CLI command as specified by command metadata in the at least one parse chain to extract data therefrom; and
presenting the extracted data to the non-native application, wherein the extracted data is formatted as specified in the associated schema definition file prior to the presenting;
wherein the schema definition file comprises an XML file defining commands associated with the non-native application after the XML file has been transformed using eXtensible Stylesheet Language Transformation ("XSLT"), wherein the XSLT transforms the XML file into command syntactical metadata and command data format information comprising the schema definition file.

11. The media of claim 10, wherein the extracted data is formatted as an XML file.

12. The media of claim 10 further including code for execution and when executed by a processor is operable to perform operations comprising:
receiving a response from the non-native application, wherein the response is formatted as specified in the associated schema definition file and comprises at least one of requested data, an indication of success, and an indication of failure; and
returning the response to the network administrator.

13. The media of claim 10 further including code for execution and when executed by a processor is operable to perform operations comprising storing the command file in persistent storage associated with the network element.

14. The media of claim 10, wherein the schema definition file comprises an XML Schema Definition ("XSD").

15. The media of claim 10, wherein the non-native application comprises an open network program.

16. An apparatus comprising:
a memory element configured to store data;
a processor operable to execute instructions associated with the data; and
a module configured to:
compile a schema definition file associated with a non-native application into a command file, the non-native application being executable in connection with a network element;
create at least one parse chain for the non-native application, wherein the at least one parse chain comprises command metadata for parsing Command Line Interface ("CLI") commands and extracting data input from the CLI commands;
store the at least one parse chain in a database;
receive a first CLI command associated with the non-native application from a network administrator;
parse the received first CLI command as specified by command metadata in the at least one parse chain to extract data therefrom; and
present the extracted data to the non-native application, wherein the extracted data is formatted as specified in the associated schema definition file prior to the presenting;
wherein the schema definition file comprises an XML file defining commands associated with the non-native application after the XML file has been transformed using eXtensible Stylesheet Language Transformation ("XSLT"), wherein the XSLT transforms the XML file into command syntactical metadata and command data format information comprising the schema definition file.

17. The apparatus of claim 16, wherein the module is further configured to:
receive a response from the non-native application, wherein the response is formatted as specified in the associated schema definition file and comprises at least one of requested data, an indication of success, and an indication of failure; and
return the response to the network administrator.

18. The apparatus of claim 16, wherein the module is further configured to store the command file in persistent storage associated with the network element.

* * * * *